D. L. WINTERS.
WATER PURIFYING APPARATUS.
APPLICATION FILED AUG. 21, 1911.
1,030,366.
Patented June 25, 1912.
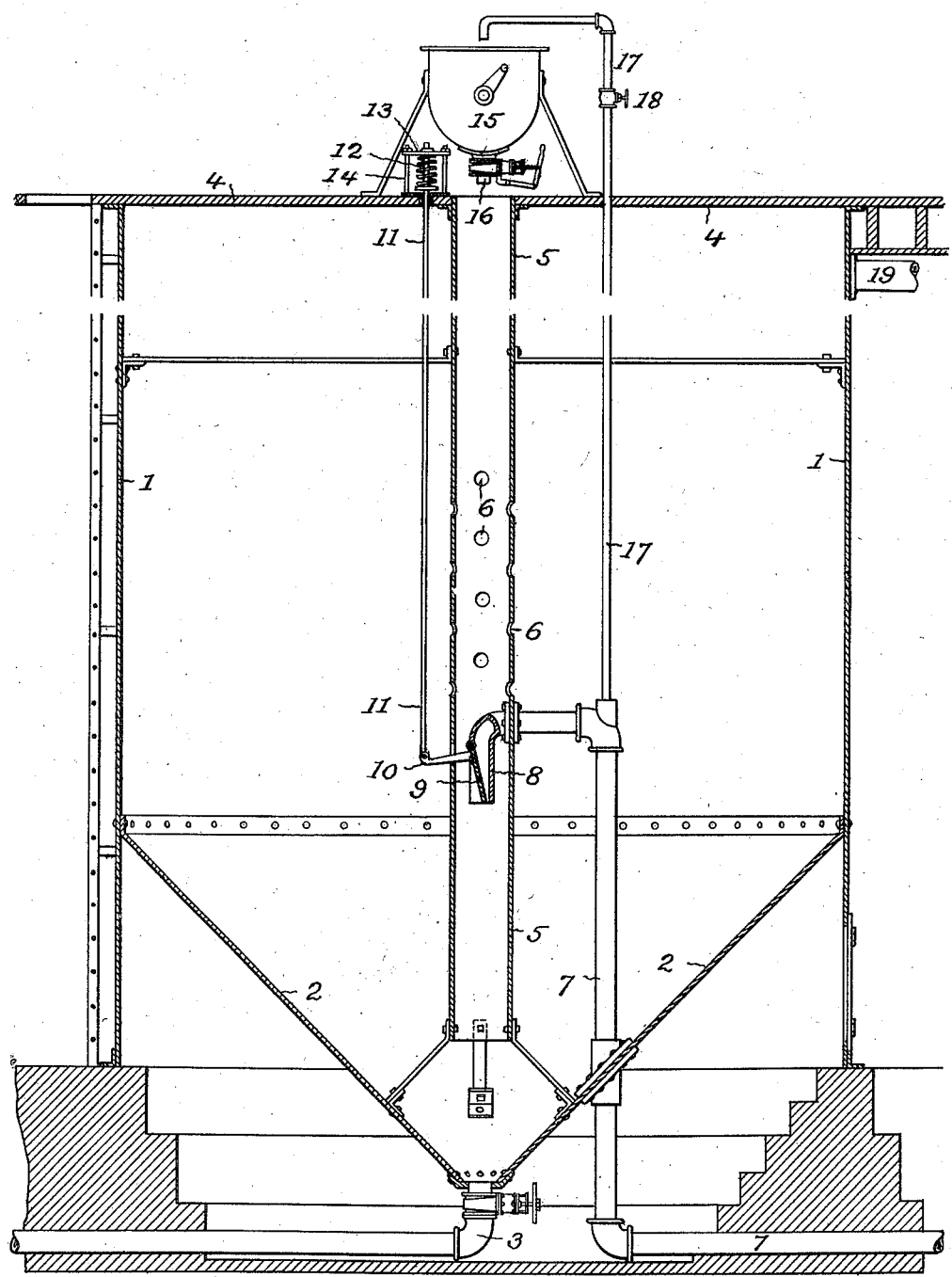
Attest:
Chas. H. Buell
Henry Moe.
Inventor:
David L. Winters.
by Robert Burns, Atty.

UNITED STATES PATENT OFFICE.

DAVID L. WINTERS, OF CHICAGO, ILLINOIS.

WATER-PURIFYING APPARATUS.

1,030,366.  Specification of Letters Patent.  Patented June 25, 1912.

Application filed August 21, 1911. Serial No. 645,110.

*To all whom it may concern:*

Be it known that I, DAVID L. WINTERS, a citizen of the United States of America, and a resident of Chicago, in the county of Cook, State of Illinois, have invented certain new and useful Improvements in Water-Purifying Apparatus, of which the following is a specification.

This invention relates to that class of water purifying apparatus in which a small proportion of a suitable precipitating reagent or coagulent is added to the body of water before its passage into a suitable precipitating tank, and in which the impurities are separated from the water during its passage through said tank to a point of storage or use. And the present improvement has for its object to provide a simple and efficient structural arrangement and combination of the parts of the apparatus, whereby a very effective initial feeding and mixing of the reagent to the passing body of water is attained; and wherein the thorough mixing of the reagent with the water while contained in the settling or precipitating tank is attained with a resultant efficient purification of the water before it leaves the tank for use or storage, all as will hereinafter more fully appear.

The accompanying drawing is a central vertical sectional elevation of a purifying tank and its appurtenances, embodying an ordinary form of the present invention.

Referring to the drawing, 1 represents the settling or precipitating tank, preferably of a cylindrical form, arranged vertically, and provided with a hopper bottom 2 adapting the tank for ready discharge of the sludge or solid matter which accumulates in the lower portion of the tank during continued actual use, and which solid matter is periodically removed through the valved blow off pipe 3, as shown.

4 is a closed top at the upper end of the tank 1, preferably formed as a working floor as shown, and upon which the hereinafter described accessory appliances of the purifying apparatus are supported.

5 is a vertical chamber or passageway formed in any usual and suitable manner in the central portion of the tank 1, and preferably of a vertical section of tubing, with its open lower end arranged in separated relation to the hopper bottom 2 of the tank 1, as shown. In the preferred form of the present invention the upper end of the section of tubing forming the chamber or passageway 5, extends through the top or floor 4, and is left open for the purpose hereinafter stated.

6 are a vertical series of openings formed at the mid-height of the aforesaid section of tubing which forms the chamber or passageway 5, so as to leave imperforate upper and lower portions of said walls for the purpose hereinafter stated.

7 is the induction or inlet pipe through which the water to be purified is pumped from a suitable source. In the present improvement the outlet end of said pipe connects with and discharges through the jet nozzle now to be described.

8 is a downwardly discharging jet nozzle arranged centrally in the section of tubing which forms the aforesaid chamber 5, and located immediately below the lowermost of the aforesaid series of openings 6 in said tube as shown. In its preferred form the jet nozzle 8 is of an automatic construction adapted to vary its discharge area in accordance with the rapidity of the flow of water and consequent pressure in the inlet pipe 7, and such automatic nature in said nozzle may be attained in any usual and suitable manner, preferably by making one or more side walls 9 of the nozzle separate from the main body of the nozzle and pivotally connecting the parts together as shown.

10 is a fixed lateral arm on the side wall 9 aforesaid, and 11 is a push rod extending vertically from the free end of said arm to the top or floor 4 of the tank 1, where it is adapted to have compression engagement with a spring 12 or its equivalent.

13 is an abutment plate for the spring 12, aforesaid, and 14 are adjusting bolts engaging said plate, and adapted to regulate the tension of said spring as the judgment of the operator may direct in regulating the velocity of the flow of water from the said nozzle in continued actual use.

15 is a mixing tank for the chemical reagent used in the process of purification. Said tank has the usual stirring mechanism whereby its contents are kept in an agitated condition.

16 is a valved outlet neck at the bottom of the mixing tank 15, adapted to discharge into the open upper end of the section of tubing which forms the vertical chamber or passage 5 of the main tank 1.

17 is a water supply pipe of small capacity, as compared with that of the water inlet pipe 7, aforesaid, and connected thereto, so as to take a proportionate volume of water therefrom, and in turn conduct the same to the mixing tank 15, aforesaid. Said pipe 17 is provided with a controlling valve 18, and the arrangement is such that a constant supply of water is discharged into said mixing tank 15, to take up portions of the chemical reagent contained therein, and in turn pass out of the mixing tank and into the aforesaid chamber 5 for final mixture with the body of water in the main tank 1 to attain a purification of the same.

In the operation of the present apparatus, the water supply to be purified, as it passes into the tank 1, through the nozzle 8, causes a downward fluid circulation in the lower portion of the vertical chamber 5, and out through the lower end of the same. Such circulation is in turn communicated to the entire lower portion of the body of water in the tank, and the circuit is endless through the openings 6 in the walls of the chamber 5, down through said chamber 5, out at the bottom of the same, to return through the lower portion of the tank 1 to the openings 6 for a succeeding travel in a like path. With the described operation the purified water gradually accumulates in the upper portion of the tank 1, in a location unaffected by the circulatory action above described, and adapted to be drawn off for use through the outlet pipe 19 at the upper end of the tank 1.

The purifying reagent when fed into the upper end of the section of tubing which forms the vertical chamber 5, is very uniformly mixed with the water in the lower part of the tank 1, by the fluid circulation above described, and without affecting the purified water in the upper end of said tank. The scope of the present invention in this connection is not however limited to such preferred manner of introducing the chemical reagent, which may be introduced into the supply of water by any usual means prior to its passage in the tank 1 through the inlet pipe 7, aforesaid.

Having thus fully described my said invention what I claim as new and desire to secure by Letters Patent, is:—

1. In a water purifying apparatus, the combination of a tank, a water supply pipe for the same, means surrounding the outlet end of said supply pipe and formed with openings to the front and rear of the outlet of the supply pipe in communication with the water of the tank, and adapted to cause a circulation of the water in the tank toward the supply pipe for remixing, and means for supplying a purifying reagent to the water undergoing treatment.

2. In a water purifying apparatus, the combination of a tank, a water supply pipe for the same, means surrounding the outlet end of said supply pipe to effect a circulation of the water in the tank, said means being formed with a multiplicity of openings a distance below the normal water line of the tanks to effect an intermixture of the water being circulated, and means for supplying a purifying reagent to the water undergoing treatment.

3. In a water purifying apparatus, the combination of a tank, a water supply pipe for the same, means for constricting the outlet end of said pipe, means surrounding the outlet end of said pipe to effect a circulation of the water in the tank, and means for supplying a purifying reagent to the water undergoing treatment.

4. In a water purifying apparatus, the combination of a tank, a water supply pipe for the same, means for constricting the outlet end of said pipe, means surrounding the outlet end of said pipe to effect a circulation of the water in the tank, said means being formed with a multiplicity of openings to effect an intermixture of the water being circulated, and means for supplying a purifying reagent to the water undergoing treatment.

5. In a water purifying apparatus, the combination of a tank, a water supply pipe for the same, automatic means for constricting the outlet end of said pipe, means surrounding the outlet end of said pipe to effect a circulation of the water in the tank, and means for supplying a purifying reagent to the water undergoing treatment.

6. In a water purifying apparatus, the combination of a tank, a water supply pipe for the same, a downturned jet nozzle attached to the outlet end of said water supply pipe, means surrounding said nozzle for effecting a circulation of the fluid contained in the lower part of the tank, and means for supplying a purifying reagent to the water under treatment.

7. In a water purifying apparatus, the combination of a tank, a water supply pipe for the same, a downturned jet nozzle attached to the outlet end of said water supply pipe, a vertical section of tubing surrounding the jet nozzle and provided with a vertical series of openings at a point above said nozzle and with an open lower end, and means for supplying a purifying reagent to the water under treatment.

8. In a water purifying apparatus, the combination of a tank, a water supply pipe for the same, a downturned jet nozzle attached to the outlet end of said water supply pipe, a vertical section of tubing surrounding the jet nozzle and provided with a vertical series of openings at a point above said nozzle and open at its upper and lower ends, and means for introducing a supply of a purifying reagent into the upper end of said section of tubing.

9. In a water purifying apparatus, the combination of a tank, a water supply pipe for the same, a downturned jet nozzle attached to the outlet end of said water supply pipe, a vertical section of tubing surrounding the jet nozzle and provided with a vertical series of openings at a point above said nozzle and open at its upper and lower ends, and means for introducing a constant supply of a purifying reagent into the upper end of said section of tubing, the same comprising a reagent mixer adapted to discharge into the upper end of said section of tubing, and a water supply pipe connected to the water induction pipe aforesaid and adapted to discharge a supply of water into said mixer.

Signed at Chicago, Illinois, this 17th day of August 1911.

DAVID L. WINTERS.

Witnesses:
 ROBERT BURNS,
 HENRY MOE.